United States Patent [19]
Lea

[11] Patent Number: 4,601,025
[45] Date of Patent: Jul. 15, 1986

[54] ANGLE TRACKING SYSTEM
[75] Inventor: John D. Lea, Huntington, N.Y.
[73] Assignee: Sperry Corporation, New York, N.Y.
[21] Appl. No.: 546,758
[22] Filed: Oct. 28, 1983
[51] Int. Cl.$^4$ .................................................. G01S 3/82
[52] U.S. Cl. ..................................... 367/125; 367/127
[58] Field of Search .................. 367/125, 127; 343/378

[56] References Cited
U.S. PATENT DOCUMENTS 3,249,911  5/1966  Gustafsson .......................... 367/125
3,545,000  12/1970  Heflinger .......................... 367/127 X Primary Examiner—Richard A. Farley
Attorney, Agent, or Firm—Howard P. Terry; Seymour Levine

[57] ABSTRACT

An apparatus for determining an angle of incidence of a received signal utilizes two widely spaced interferometers with equal length crossing baselines. The time differential of a signal arrival between the two elements of each interferometer is established and the difference between the two time differentials is determined. Multiplying this difference by a predetermined constant provides the desired angle.

9 Claims, 9 Drawing Figures (1) $\cos \psi = \dfrac{(\frac{h}{2})^2 + (\overline{OP})^2 - (\overline{OQ})^2}{h(\overline{OP})}$ (2) $-\cos \psi = \dfrac{(\frac{h}{2})^2 + (\overline{OP})^2 - (\overline{OR})^2}{h(\overline{OP})}$ (3) $\cos \psi = \dfrac{(\overline{OR})^2 - (\overline{OQ})^2}{2h(\overline{OP})}$ (4) $(\overline{OQ})^2 = \dfrac{1}{2}\left[(\overline{OA})^2 + (\overline{OC})^2 - \dfrac{\ell^2}{2}\right]$ (5) $(\overline{OR})^2 = \dfrac{1}{2}\left[(\overline{OD})^2 + (\overline{OB})^2 - \dfrac{\ell^2}{2}\right]$ (6) $\cos \psi = \dfrac{\left[(OD)^2 - (OA)^2\right] + \left[(OB)^2 - (OC)^2\right]}{4(\overline{OP})h}$ (7a) $(\overline{OD})^2 - (\overline{OA})^2 = 2(\overline{AD})(\overline{OP})\cos \theta_2$ (7b) $(\overline{OB})^2 - (\overline{OC})^2 = -2(\overline{BC})(\overline{OP})\cos \theta_1$ (7c) $\overline{AD} = \overline{BC} = L$ (8) $\cos \psi = \dfrac{\overline{AD}}{2h}\left[\cos \theta_2 - \cos \theta_1\right]$ (9a) $\cos \theta_1 = \dfrac{V_1}{L} t_1$  (9b) $\cos \theta_2 = \dfrac{V_1}{L} t_2$

(10) $\cos \psi = \dfrac{V_1}{2h}(t_2 - t_1)$

(11) $E_D = \psi - 90°$

(12) $\sin E_D = \dfrac{V_1}{2h}(t_1 - t_2)$

(13) $t_D = \dfrac{L}{V_1} \cos \theta_i$

(14) $S = 2\dfrac{V_2}{V_1} L \sin \dfrac{\theta_B}{4} \sin(\theta_i + \dfrac{\theta_B}{4})$

(15) $X = \dfrac{S}{2} + \dfrac{V_2}{V_1} L \sin \dfrac{\theta'}{2} \sin(\theta_i + \dfrac{\theta'}{2})$

(16) $t_1 - t_2 = \dfrac{2(X_1 - X_2)}{v_s}$

(17) $\Phi_{11}(\tau) = \dfrac{1}{T} \int_{-\frac{T}{2}}^{T/2} f(t) f(t+\tau) dt$

FIG.3.

ANGLE TRACKING SYSTEM

BACKGROUND OF THE INVENTION

1. Field of the Invention

The invention pertains to angle of signal arrival measurements and more specifically to the measurement of the vertical angle of the signal arriving from a source not necessarily in the horizontal plane of the receiver.

2. Description of the Prior Art

Interferometric methods for measuring arrival angles of received signals have long been in use in the sonar and radar art. In these systems, the time difference of arrival at receivers positioned a predetermined distance apart is determined by correlation techniques, if the signals are continuous, or by timing techniques, if the signals are pulses. This difference in time of arrival and the separation distance is utilized to determine the angle of arrival of the signal with an accuracy that is a function of the receiver separation, improving as the separation increases. The measured angle is in the plane of signal propagation defined by the two receivers and the source. In many applications, however, the horizontal plane source angle i.e. azimuth or bearing is required rather than the angle in the signal propagation plane provided by the interferometer. A conversion from the signal propagation angle to the horizontal plane angle may readily be realized with knowledge of the vertical angle of arrival of the signal. Vertical angle of arrival is also useful for other applications, such as establishing the relative altitude or depth of the signal source. Prior art methods of measuring vertical angle are of limited accuracy and resolution capability.

Vertical angle measurements have been made in the prior art with two beams having peaks offset at equal and opposite angles from a reference angle to establish equal amplitude responses for signals incident from the reference direction. In a sonar system, an acoustic signal arriving from the reference angle direction induces electrical signals in the beam transducers of equal magnitude establishing a zero signal difference therebetween. Acoustic signals arriving from angular directions other than the reference angle induce electrical signals that differ from zero, having a magnitude as a function of the angle off the reference angle and a polarity which is determined by whether the arrival angle is less than or greater than the reference angle. The accuracy of these systems is generally poor, being a function of the relative beam shapes of the transducers and the interpolation.

Greater accuracy than that obtainable with amplitude interpolation systems may be achieved with the utilization of a vertically split array to effectively establish two transducer arrays with a physical separation therebetween. These systems determine the time difference of arrival of a signal incident to the dual array. This time difference is a function of the angle from the perpendicular to the array surface and does not depend on the array beam shape, being only a function of the angle of arrival and the dual array separation. Array separation, however, is generally small requiring that the difference between two nearly equal times of arrival be determined, thus limiting the accuracy of the system. Additionally, the small separation between the dual arrays causes the noise at the output terminals of each array to be correlated, adversely affecting the signal-to-noise ratio of the system and concomitantly the angle determination accuracy. Further, the dual arrays overlap in the azimuthal plane and thereby cannot resolve targets within the azimuthal beam width of the arrays. This limitation of bearing resolution causes the dual array to respond to the centroid of multiple targets within the azimuthal beam width.

SUMMARY OF THE INVENTION

An angle measuring system constructed in accordance with the principles of the present invention includes two widely separated split array pairs, each pair comprising upper and lower arrays with parallelly scanned receiving beams. The upper array of one pair and the lower array of the other are coupled to form two wide based interferometer pairs. In each pair the signal arrival time differential between the arrays is determined and utilized to establish the desired angle to the target.

BRIEF DESCRIPTION OF THE DRAWINGS

FIG. 3 is a tabulation of formulas useful for explaining the invention.

Figure numeral 4a and 4b comprise a block diagram of an embodiment of the invention.

Figure 5:
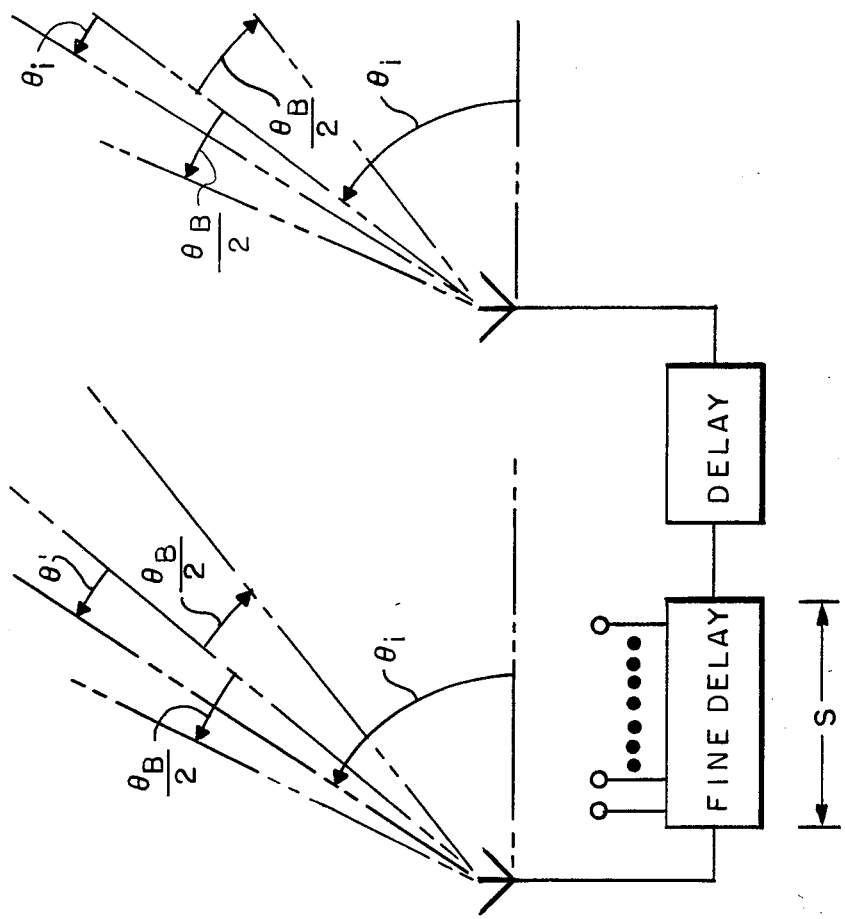

FIG. 5 is a geometrical representation of ray paths within an array beamwidth that is useful in the determination of the length of the delay line employed in the invention.

Figure 6:
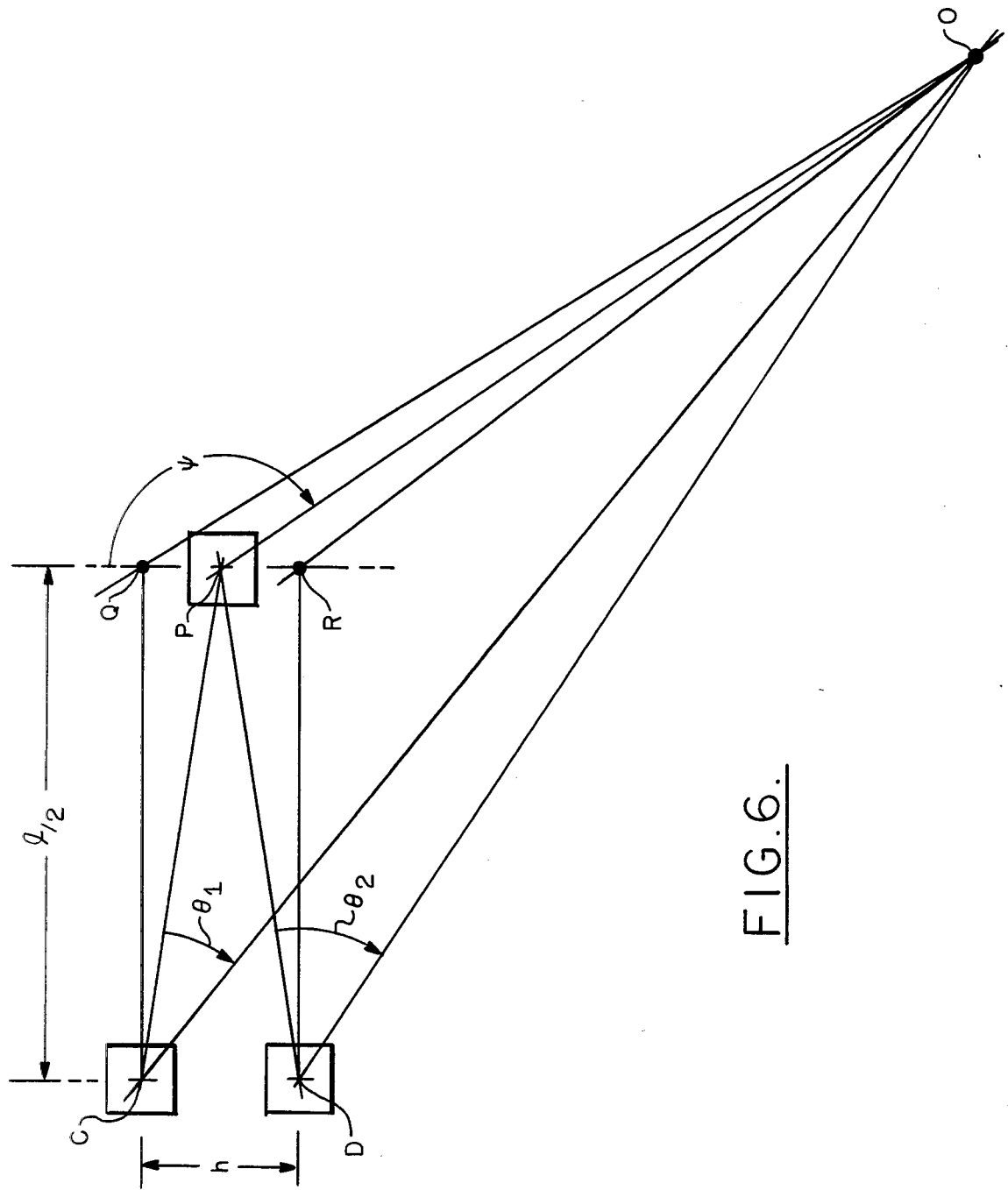

FIG. 6 depicts the ray line geometry of a three receiver implementation of the invention.

Figure 7:
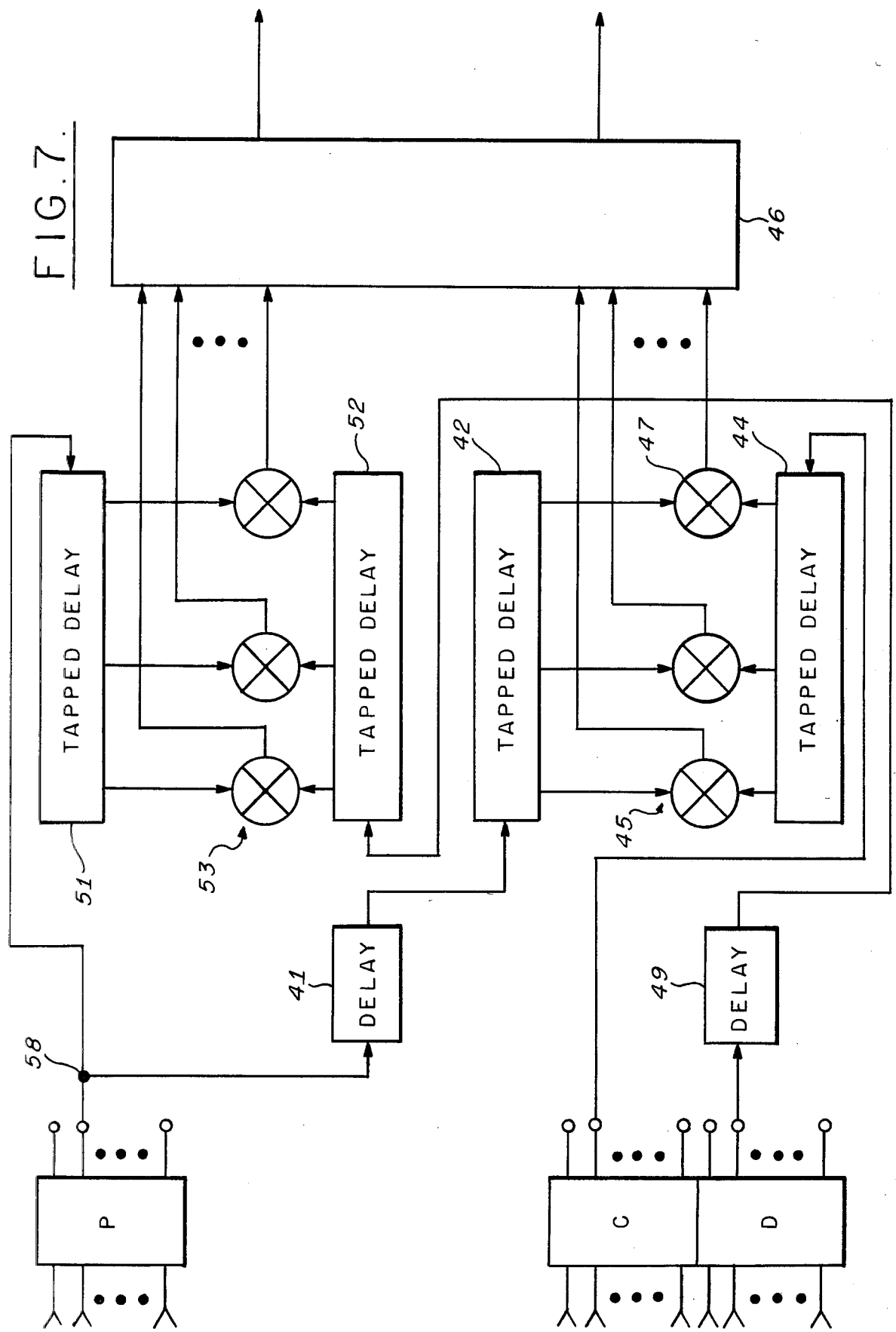

FIG. 7 is a block diagram of another embodiment of the invention.

DESCRIPTION OF THE PREFERRED EMBODIMENTS

Figure 1:
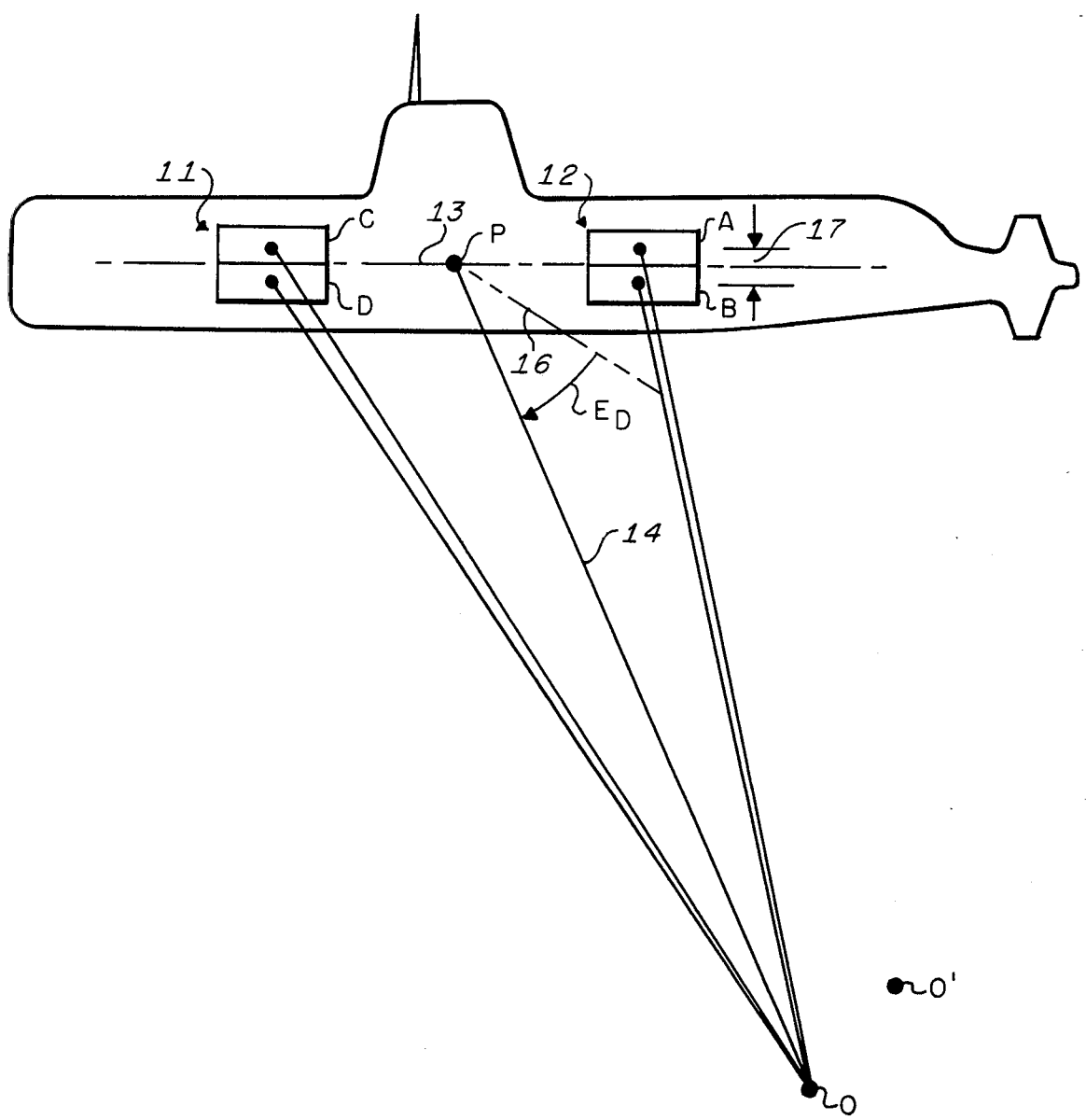
FIG. 1 is a pictorial representation of dual arrays mounted on a ship with ray lines to the target indicated thereon.

In FIG. 1, sonar arrays 11, 12 are shown mounted on a ship along a wide baseline 13 which is coincident with a horizontal reference axis. Each array is split to form two subarrays giving rise to subarrays A, B, C, D. Range 14 to the target is measured from the midpoint P between the arrays while the depression angle $E_D$ is measured from the horizontal 16. This depression angle may be determined from the separation 17 between the phase centers of the split array and the deferential time of arrival therebetween of a signal emitted from the target O. Since the separations of the phase centers of the split arrays A, B and C, D is short, the received noise in adjacent split arrays is correlated, as for example the noise received by the split arrays A, B. This correlation of received noise adversely affects the depression angle measurement accuracy. Additionally, when the signals received by the four arrays A, D, C, B from the target O are processed as in the prior art, signals from targets at O and O' that are within an array beamwidth cannot be resolved and angular measurements corresponding to the target signal centroid result. These deficiencies of the prior art are remedied by determining the differential time of arrival of received signals at subarrays A, D and subarrays C, B, as will be described subsequently. The long baseline established between the correlating subarrays significantly reduces the noise signal correlation at the subarrays and significantly improves the target resolution capability of the system.

Figure 2A:
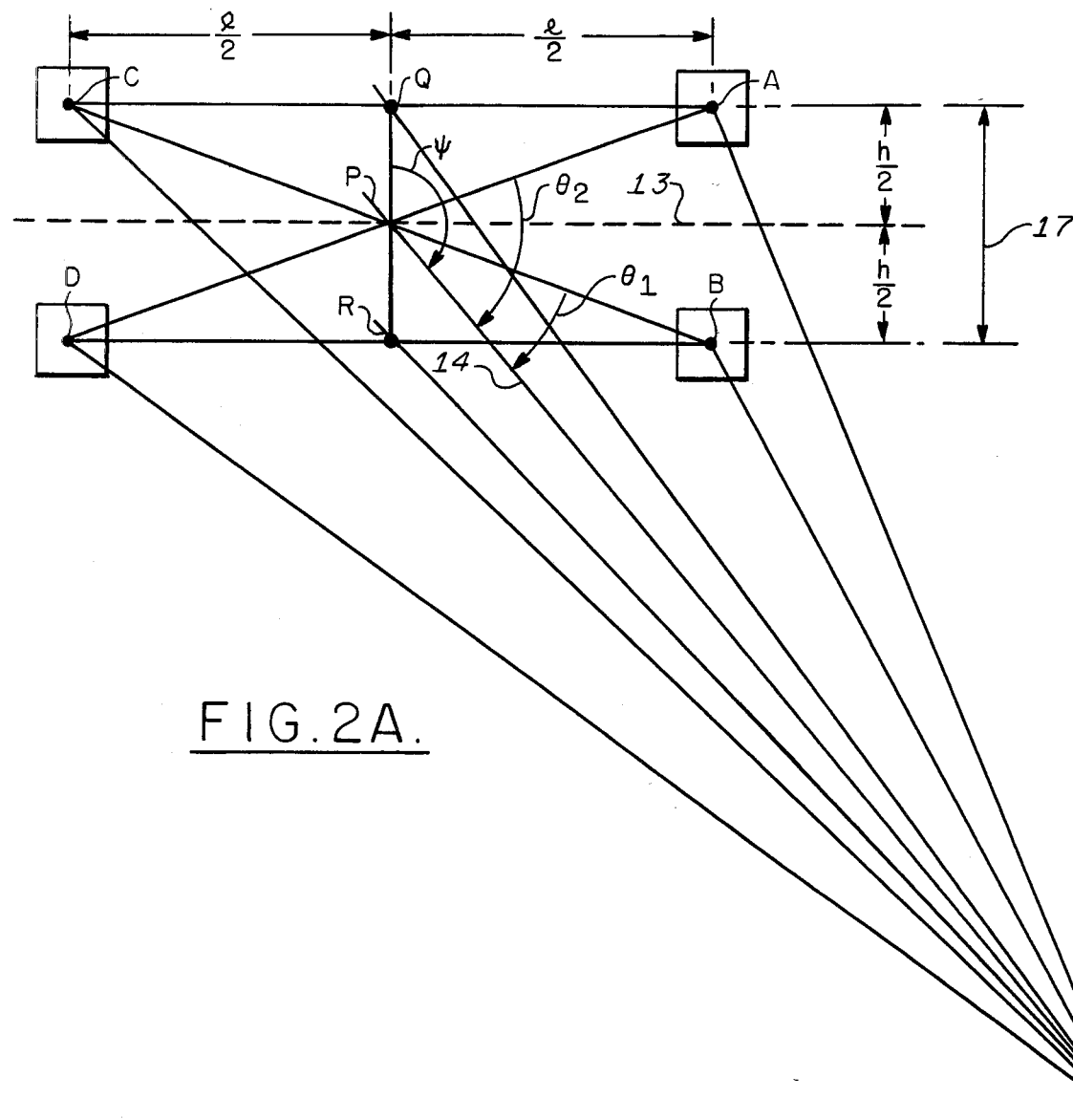
FIGS. 2A and 2B depict the ray line geometry between a target of interest and the dual split arrays.

Refer now to FIG. 2A wherein previously referenced elements are given the previously assigned reference numerals and wherein line RQ is coincident with a vertical reference axis. Consider the triangle OPQ, where Q is the midpoint between the phase centers of the subarrays A, C and is h/2 vertically distant from the midpoint of the overall array P, h being the vertical subarray phase center separation 17. The horizontal subarray phase center separation being l. The application of the law of cosines to the triangle OPQ yields the equation 1 of FIG. 3 for the cosine of the angle $\psi$ between the vertical PQ and the range ray OP. Similarly, the application of the law of cosines to the triangle OPR, where R is the midpoint between the subarrays B, D yields the expression for cos $\psi$ given by equation 2. Equation 3 is an expression for cos $\psi$ in terms of the distances OR, OQ, and OP that is obtained by subtracting equation 2 from equation 1. Expressions for distances OQ and OR shown in equations 4 and 5 may be obtained by applying the law of cosines to triangles OAC, OAQ and OBD, OBR, respectively. Substituting equations 4 and 5 into equation 3 yields the expression for cos $\psi$ given in equation 6. Expressions for the bracketed terms in the numerator of equation 6 may be obtained by applying the law of cosines to the triangles in the planes OAD and OBC. These expressions are shown in equations 7a and 7b. Equation 7c states that the diagonal distance AD is equal to the diagonal distance BC. This is a consequence of the positioning of the phase centers of the subarrays at the corners of a rectangle. The substitutions of the equations 7 into equation 6 yields an expression for cos $\psi$ in terms of the angles of incidence to the diagonally positioned interferometers A, D and C, B are shown in equation 8.

Figure 2B:
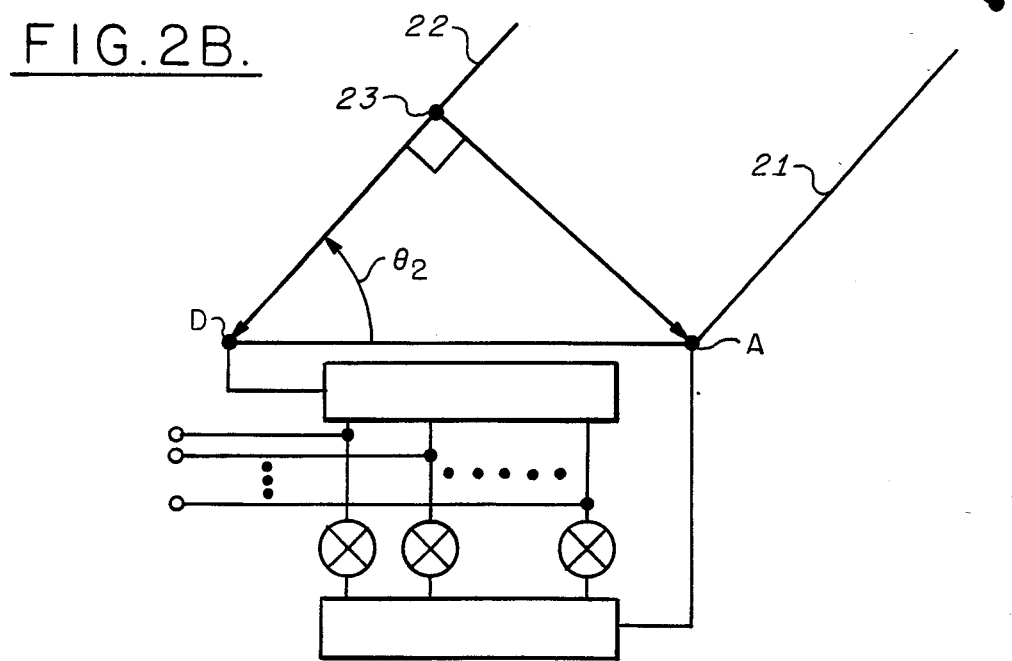

Refer now to FIG. 2B wherein ray 21 and ray 22 are respectively shown incident to subarray A and subarray D. Rays 21, 22 correspond to the rays OA and OD of FIG. 2A, respectively, when the position O is at a distance from the array that is very much greater than the length of the baseline AD. Under these conditions, the rays 21, 22 are substantially parallel and the path length difference to the subarrays A, D of signals emitted from a target at position O may be determined by dropping a perpendicular from the subarray A to intercept ray 22 at a point 23. The distance between point 23 and subarray D is therefore the differential path length to subarrays A,D of a signal emitted from a target of position O. Since the rays 21, 22 are substantially parallel, it follows that the ray OP of FIG. 2A is substantially parallel to these rays and the angle between AD and D (23) is equal to the angle $\theta_2$ shown in FIG. 2A. Similarly, the differential ray paths of a signal emitted by a target at position O to the phase centers of subarrays B, C may be determined from the baseline BC and the angle $\theta_1$. From the above it is apparent that cos $\theta_1$ and cos $\theta_2$ are given by equations 9a, 9b, wherein $V_1$ is the propagation velocity of the wavefront 33 and $t_1$ and $t_2$ are the differential times of arrival. Consequently, the difference between the differential time delays of the interferometers AD, BC determines the depression angle $\psi$ from the vertical as given in equation 10. Since the depression angle from the horizontal $E_D$ is equal to the depression angle from the vertical less 90 degrees as shown in equation 11, it follows that depression angle from the vertical $E_D$ is given by equation 12.

Figure 4A:
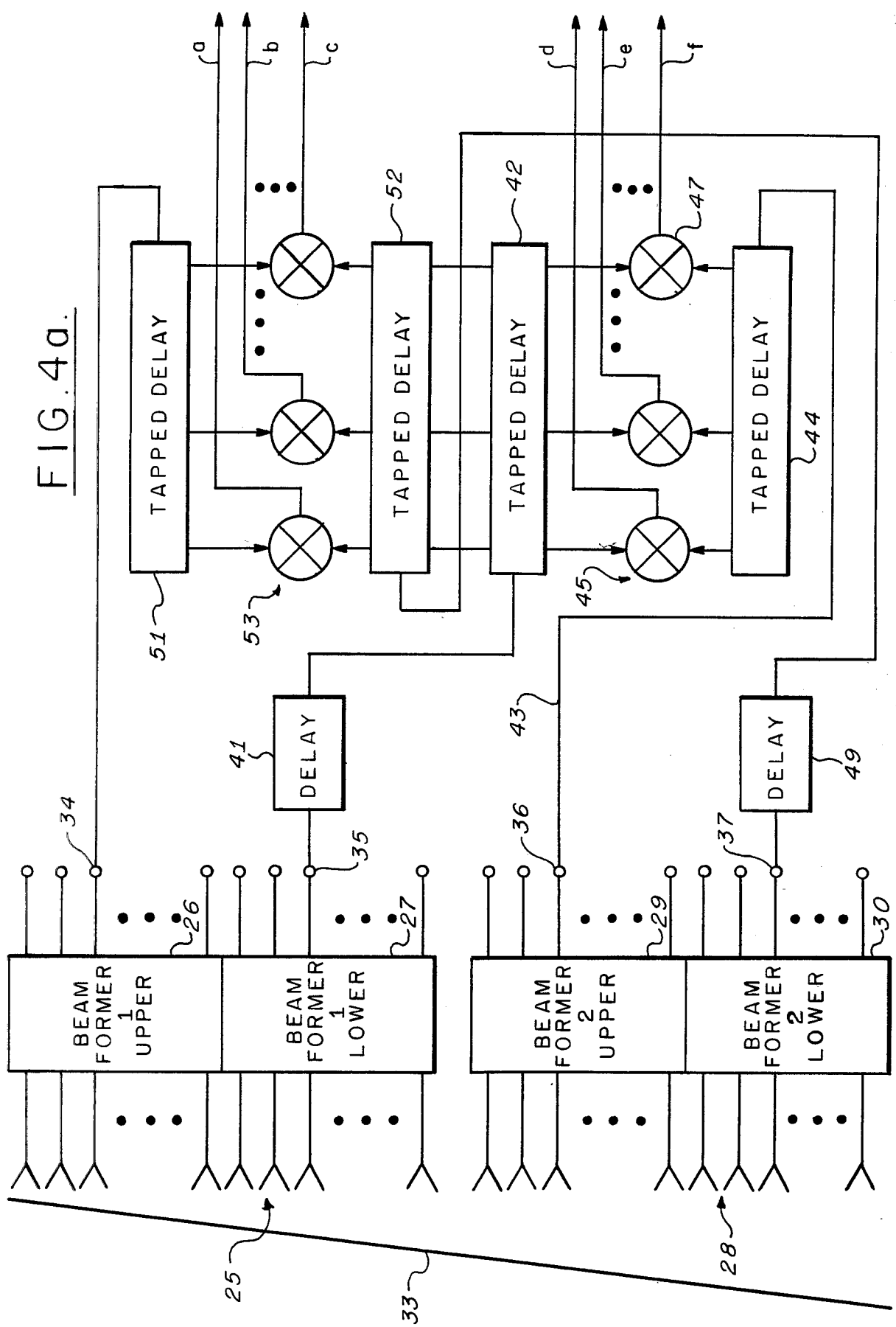
Figure 4B:
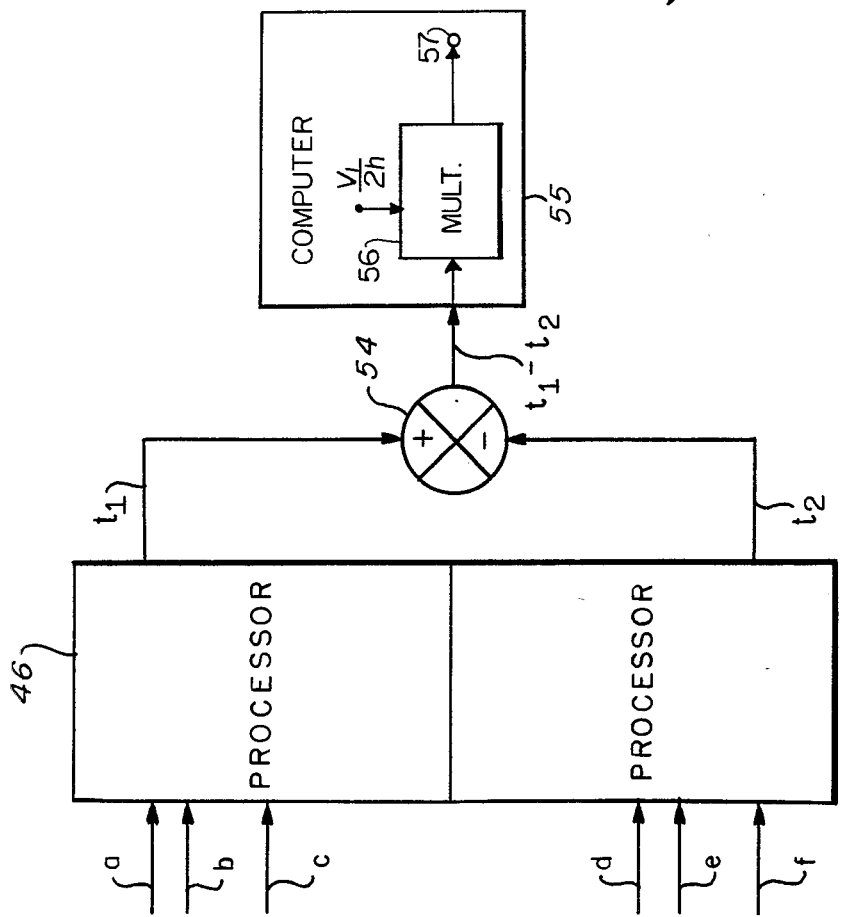

Referring now to FIG. 4, a first array of receiving elements 25 may be coupled to beam formers 26, 27 to form upper and lower receiving beams and a second array of elements 28 may be coupled to beam formers 29, 30 to form a second set of upper and lower receiving beams. A phase front 33 incident to arrays 25, 28 induces a signal at output port 34 of beam former 26, output port 35 of beam former 27, output port 36 of beam former 29, and output port 37 of beam former 30. Each of the output ports couple to signals that arrive at angles within a beam centered at an angle $\theta_i$ from the baseline between the phase centers of an upper and lower beam combination, as for example the phase center of the array of elements coupled to upper beam former 26 and the phase center of the array of elements coupled to lower beam former 30, as represented in FIG. 5. Signals at the output port 35 of lower beam former 27 are coupled through a delay line 41 to the input terminal of a tapped delay line 42, while signals at output terminal 36 of upper beam former 29 are coupled via line 43 to the input terminal of a tapped delay line 44. Each tap on the tapped delay line 44 is an incremental fine time delay from the coarse time delay of delay line 41. The input terminals to delay lines 42, 44 are oppositely positioned to provide differential time delays as will be explained subsequently. Corresponding output terminals of delay lines 42, 44 are coupled to correlators 45 wherein signals at corresponding taps are correlated and wherefrom a multiplicity of correlation signals is coupled to a processor 46.

Delay line 41 provides a delay $t_D$ that is given by equation 13 in FIG. 3, L being the length of the baseline. When a signal arrives at an angle $\theta_i$ corresponding to the beam peak, the delayed output signal from terminal 35 and the undelayed output signal from terminal 36 arrive at the input terminals of delay lines 42, 44 at substantially the same time and are thereby in phase at the central taps of the delay lines 42, 44, thus establishing a correlation output signal from the correlator coupled to the central tap that exceeds all output signals from the correlators coupled to the other taps of the delay lines. If the signal is incident at an angle other than that corresponding to the beam peak, the signals arrive at the input terminals at delay lines 42, 44 with a differential time lag therebetween. This differential time lag causes the peak correlation signal to appear at a tap on either side of the central tap. The tap at which this peak appears is a function of the incident angle to the arrays 25, 28. If the beam width at the output terminals 35, 36 is $\theta_B$ as shown in FIG. 5 and the length S of the tap delay lines is chosen such that a signal arriving at an angle $\theta_i - \theta_{B/2}$ establishes a maximum correlation signal at the correlator 47 coupled to the last tap of the delay line 42 and the first tap of delay line 44, S is then given by equation 14 of FIG. 3 wherein $V_2$ is the propogation velocity along the tapped delay lines. For an angle $\theta'$ within the beam the maximum correlations will occur at a distance from the input end of tap delay line 43 that is given by equation 15. The output signals from the correlators 45 are coupled to processor 46, which may contain a network of comparators and logic circuits, to determine the taps that give rise to the maximum correlation signal, thereby determining the time differential of the received signals at the phase centers of the interferometer formed by the upper beam former 29 and the lower beam former 27. Similarly, the time differentials of received signals at the phase centers of the upper beam former 26 and the lower beam former 30 are determined by the delay line 49, tap delay lines 51, 52 and correlators 53. Time differentials so determined are coupled to substraction network 54 wherefrom the difference in the time differentials, given by equation 16, is coupled to a computer 55 for the determination of a depression angle in accordance with equation 12. Computer 55 contains a multiplier 56 to which signals representative of $V_1/2h$ and $(t_1-t_2)$ are coupled for multiplication to provide a signal at an output terminal 57 that is representative of the depression angle $E_D$.

The signals coupled to each of the correlators 45, 53 emanate from the same source but arrive at the correlators with time delay differentials that are functions of the angles of incidence and the time delays of the system. Thus, each correlator performs an autocorrelation in accordance with the well known formula 17 of FIG. 3. Autocorrelation function equation 17 provides a peak value when the differential time delay $\tau$ is zero. Thus, the correlator that provides the maximum correlation signal is that for which the signals coupled thereto arrive in phase. It should be recognized by those skilled in the art that the correlators at which the correlation signals are maximum are equally and oppositely displaced from the central correlator in correlators 45, 53. For each target within a subarray beam, an additional pair of peak correlations are induced in the correlators 45, 53. Since the peaks of each pair are equally and oppositely spaced from the central correlator, each pair may be identified and appropriately processed as described above. In this manner, multiple targets within a subarray beam, but at varying depression angles may be resolved and tracked.

It should be recognized that the above-described angle determination may also be accomplished by positioning a receiver at point P, the crossover of the two base lines $\overline{AD}$, $\overline{CB}$, to form a triangle with receivers at points C and D, as shown in FIG. 6. The time differences of arrival $t_1'$ and $t_2'$ measured between the receiver at P and the receivers at C and D are one-half the time differences of arrival $t_1$ and $t_2$, respectively. With the substitution $t_1=2t_1'$ and $t_2=2t_2'$ the equations of FIG. 3 may be utilized to determine the vertical angle $\psi$. The measurement of the time of arrival may be accomplished in the manner previously described.

Referring to FIG. 7, wherein elements previously discussed bear the prior assigned reference numerals, the output signals of the receiver at C may be coupled to the tapped delay line 44 while the output signals of the receiver at D may be coupled via coarse delay line 49 to tapped delay line 52. Output signals of the receiver at P are coupled from node 58 directly to tapped delay line 51 and via coarse delay line 41 to tapped delay line 42.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A passive apparatus for measuring an angle to a signal emitter comprising:

first and second means positioned with a predetermined separation distance along a first axis therebetween for receiving signals emitted from said emitter signal;

third and fourth means positioned with said predetermined separation distance along said first axis for receiving said emitted signals, located a preselected distance from said first and second means along a second axis and relatively positioned along said first axis such that said first and third means and said second and fourth means are correspondingly positioned along said first axis;

time difference means coupled to said four receiving means for providing a signal representative of a first differential time $t_1$ between a signal arrival at said first receiving means and said signal arrival at said fourth receiving means and a signal representative of a second differential time $t_2$ between said signal arrival at said second receiving means and said third receiving means: and means for providing a signal representative of a difference between times $t_1$ and $t_2$, said difference between $t_1$ and $t_2$ being representative of said angle to said signal emitter.

2. A passive angle measuring apparatus in accordance with claim 1 wherein said time difference means includes:

delay means coupled to receive signals from said second and fourth receiving means for providing time delays substantially equal to time differentials of arrival at predetermined angles of incidence between said first and fourth and said third and second receiving means;

fine delay means coupled to said delay means to receive delayed signals from said second and fourth receiving means and to receive signals directly from said first and third receiving means for providing a multiplicity of fine time delays to said delayed signals and to said directly received signals; and means coupled to said fine delay means to receive said delayed signals and said directly received signals in pairs, after corresponding fine time delays, for correlating said fine time delayed pairs of delayed signals and directly received signals.

3. A passive receiving apparatus for angular measurements in accordance with claim 2, wherein said fine delay means includes:

first tapped delay line means for providing said fine time delays having input means at ends thereof coupled to receive signals directly from said first and third receiving means; and second tapped delay means for providing said fine time delays having input means at ends thereof opposite said receiving ends of said first tapped delay means coupled to receive signals from said second and fourth receiving means delayed through said delay means;

said first and second tapped delay means having taps correspondingly positioned to form tap pairs, each pair of taps coupled to said correlating means.

4. A method of measuring an angle to a signal emitter, which comprises:

receiving a signal from said signal emitter at first, second, third, and fourth receiving means, positioned with phase centers at corners of a predetermined rectangle, said first and fourth receiving means and said second and third receiving means forming diagonally positioned pairs;

delaying signals received by said second and fourth receiving means for a time duration determined by said rectangular diagonal length and a signal angle of incidence corresponding to a peak of a receiving beam;

coupling said delayed signals from said second receiving means and signals from said third receiving means to first and second fine delay means, respectively, said first and second fine delay means having a multiplicity of corresponding output terminal pairs, each pair representative of an angle within said receiving beam;

coupling said delayed signals from said fourth receiving means and signals from said first receiving means to third and fourth fine delay means, respectively, said third and fourth fine delay means having a multiplicity of corresponding output terminal pairs, each pair representative of an angle within said receiving beam;

correlating signals at said terminal pairs of said first and second fine delay means and said third and fourth fine delay means;

determining output terminal pairs at which peak correlation signals occur; and establishing angle of signal incidence from said terminal pair peak correlation signal determination.

5. The method of claim 4, wherein the step of establishing said angle of signal incidence includes:

determining the differential time of arrival of said incident signal between said first and fourth receiving means and between said second and third receiving means;

subtracting the differential time of arrival between said first and fourth receiving means from said differential time of arrival between said second and third receiving means; and multiplying said difference between said differential time delays by a predetermined constant factor.

6. A passive apparatus for measuring an angle to a signal emitter comprising:

first and second means positioned on a first axis with a predetermined separation distance therebetween for receiving signals emitted from said signal emitter;

third means located a preselected distance from said first and second means along a second axis for receiving signals emitted from said signal emitter;

delay means coupled to receive signals from said first and third receiving means for providing time delays substantially equal to time differentials of arrival at predetermined angles of incidence between said first and third and said second and third receiving means;

fine delay means coupled to said delay means to receive delayed signals from said first and third receiving means and to receive signals directly from said second and third receiving means for providing a multiplicity of time delays to said delayed signals and to said directly received signals, said time delays and said fine time delays providing a first differential time $t_1$ between a signal arrival at said first receiving means and a signal arrival at said third receiving means, and a second differential time $t_2$ between a signal arrival at said second receiving means and a signal arrival at said third receiving means;

means coupled to said fine delay means to receive said delayed signals and coupled to receive said directly received signals, after corresponding fine time delays, for correlating said fine time delayed signals and directly received signals; and means for providing a signal representative of difference between times $t_1$ and $t_2$ that is representative of said angle to said signal emitter.

7. A passive receiving apparatus for angular measurements in accordance with claim 6, wherein said fine delay means includes:

first tapped delay line means for providing said fine time delays having input means at ends thereof coupled to receive signals directly from said second and third receiving means; and second tapped delay means for providing said fine time delays having input means at ends thereof opposite said receiving ends of said first tapped delay means coupled to receive signals from said first and third receiving means delayed through said delay means;

said first and second tapped delay means having taps correspondingly positioned to form tap pairs, each pair of taps coupled to said correlating means.

8. A method of measuring an angle to a signal emitter, which comprises:

receiving a signal from said signal emiter at first, second and third receiving means, positioned with phase centers at corners of a predetermined isoceles triangle with a base through said phase centers of said first and second receiving means;

delaying signals received by said first and third receiving means for a time duration determned by said isoceles triangle side length and a signal angle of incidence corresponding to a peak of a beam incident to said receiving means:

coupling said delayed signals from said first and third receiving means to first and second fine delay means, respectively, said first and second fine delay means having a multiplicity of output terminals;

coupling said signals from said second and third receiving means directly to third and fourth fine delay means, respectively, said third and fourth fine delay means having a multiplicity of output terminals respectively corresponding to output terminals of said first and second fine delay means to form terminal pairs, each pair representative of an angle within said beam incident to said receiving means;

correlating signals at said terminal pairs of said first and third fine delay means and said second and fourth fine delay means;

determining output terminal pairs at which peak correlation signals occur; and establishing angle of signal incidence from said terminal pair peak correlation signal determination.

9. The method of claim 8, wherein the step of establishing said angle of signal incidence includes:

determining the differential time of arrival of said incident signal between said first and third receiving means and between said second and third receiving means;

subtracting the differential time of arrival between said first and third receiving means from said differential time of arrival between said second and third receiving means; and multiplying said difference between said differential time delays by a predetermined constant factor.

* * * * *